Oct. 10, 1944.  R. R. ROCKHILL  2,360,015
BLOCK-OUT MECHANISM FOR DUPLICATING MACHINES
Filed Nov. 19, 1941  5 Sheets-Sheet 1

INVENTOR.
ROSCOE R. ROCKHILL
BY
Erwin B. Eiring
ATTORNEY

Oct. 10, 1944.  R. R. ROCKHILL  2,360,015

BLOCK-OUT MECHANISM FOR DUPLICATING MACHINES

Filed Nov. 19, 1941  5 Sheets-Sheet 4

INVENTOR.
ROSCOE R. ROCKHILL
BY
ATTORNEY

Oct. 10, 1944.    R. R. ROCKHILL        2,360,015
BLOCK-OUT MECHANISM FOR DUPLICATING MACHINES
Filed Nov. 19, 1941        5 Sheets-Sheet 5

| PART NO. | A | B | C | D | E |
|---|---|---|---|---|---|
| OPER. NO. | 1 | 2 | 3 | 4 | 5 |
| PIECES | 1000 | 100 | 10 | 500 | 50 |
| RATE | .015 | .02 | .10 | .01 | .05 |

| PART NO. | A | B | C | D | E |
|---|---|---|---|---|---|
| OPER. NO | 1 | 2 | 3 | 4 | 5 |
| COST | 1.50 | 2.00 | 1.00 | 5.00 | 2.50 |

Fig. 16

INVENTOR.
ROSCOE R. ROCKHILL
BY
ATTORNEY

Patented Oct. 10, 1944

2,360,015

UNITED STATES PATENT OFFICE 2,360,015

BLOCK-OUT MECHANISM FOR DUPLICATING MACHINES

Roscoe R. Rockhill, Shorewood, Wis., assignor to Rex-O-graph, Inc., Milwaukee, Wis., a corporation of Wisconsin Application November 19, 1941, Serial No. 419,768

19 Claims. (Cl. 101—132.5)

This invention relates to duplicating machines of the moistened roller type, and more particularly to a new and improved block-out mechanism therefor.

The primary object of the present invention resides in the provision in a duplicating machine of a new and improved block-out mechanism including a squeegee or wiper element adapted to contact a rotatable moistening roller to remove moisture from a portion of the surface of the roller to preclude the moistening of a selected portion of a copy sheet whereby the cooperating portion of material contained on the master sheet is blocked-out on the copies made therefrom.

A further object of the present invention resides in the provision of a new and improved block-out mechanism operative selectively under either manual or automatic control whereby lines, columns, or selected portions of either or both that appear on the master sheet may be omitted from one or more of the copies made therefrom.

Another object of the invention, with reference to the manual control of the block-out mechanism, resides in the provision of means for releasably retaining the individual squeegee or wiper elements in either operative or inoperative position with reference to the moistening roller.

Another object of the present invention, with reference to the automatic control of the block-out mechanism, resides in the provision of new and improved means in the form of power driven cam means adapted to control the automatic advance or retraction of the individual squeegee or wiper elements to place them in a position to remove moisture from the moistening roller or to free them from wiping contact with the moistening roller.

A further object of the present invention resides in the provision in a duplicating machine of a plurality of separately controlled wiper elements lying in side by side contact so that by proper manipulation of the wiper elements either by hand or automatic operation the wiping elements may be advanced into wiping contact with the moistening roller to free the same of moistening liquid with the result that no moisture is conveyed to the copy sheet and hence no copy of material from the master sheet will be impressed upon the moisture-free portion or portions of the copy sheet as it passes under the impression roller in contact with the master sheet carried by the drum. By reason of this condition, it is possible in the instance of manual manipulation of the wiper elements to block-out selected lines of material or columns or portions thereof contained on the master sheet. By utilizing the automatic control of the wiper element, it is possible, with the proper adjustment and positioning of the individual cam elements to omit desired portions of any selected line or lines thereby effecting the omission either of individual entries in selected columns, or of entire columns of entries as may be dictated by the form of copy desired to be made from the master sheet which contains complete data without omissions of any material.

Another object lies in the provision of new and improved means for effecting adjustment of the several wiper elements transversely of the machine to position the element or elements in desired spaced relationship to effect proper registry with lines or columns of material contained on the master sheet.

Another object lies in the provision of new and improved means for adjusting the position of the wiper elements with relation to the moistening roller so as to insure proper wiping contact with the roller to free the same of all moisture in selected areas so that the material, data, or information contained on the master sheet against which the unmoistened part or parts of the copy sheet contact will be completely omitted from the copy due to the complete absence of any moisture which is a prerequisite to the transferring of any ink from the master sheet to the copy sheet.

Another object lies in the provision of new and improved means for releasably retaining the wiper elements either in frictional wiping contact with the moistening roller or in their retracted position in which they are free from contact with the roller.

Another object lies in the provision of new and improved means in the form of a power driven cam shaft adapted to control the movement and synchronize the wiping action of the squeegee elements on the moistening roller with the advance of the master sheet on the drum so that the position of the material on the master sheet which is to be omitted from the copy sheet will contact the dry portions of the moistening roller with the result that no transfer of the portion of the material will be made onto the copy sheet.

According to the present invention, a new and improved block-out mechanism has been provided for a duplicating machine of the moistened roller type, wherein selective manual or automatic means is provided to effect timed wiping action of the moistened roller by selected wiper elements with the result that a single, or any number, of copies may be made omitting all or portions of lines or columns of material contained on the master sheet. By means of simple adjustment of cam elements controlling the automatic operation of the wiping elements any selected portion of the master sheet may be omitted in any copy produced therefrom. The particular advantage flowing from the use of the machine embodying the teachings of the present invention lies in the fact that a single master sheet may be utilized for the production of routing sheets where numerous copies are required and where it is desired to omit therefrom certain portions of the information contained on the master sheet referring, for example, to the hourly rate of workmen performing the several operations, cost of material, overhead charges or actual selling price of the finished piece of material. By way of another example, the present block-out machine can produce from a single master sheet, a shipping label, a bill of material for the stock room, a bill of material for the shipping department, a customer's invoice and one or more record invoices. In the last named example, the block-out mechanism may be utilized to advantage in deleting the unit price of the several items contained on the customer's and office copies of the invoice from the stock room, shipping department, and the shipping label copies.

Other objects and advantages of the present invention will become manifest from the following description of an illustrative embodiment of the present invention shown in the accompanying drawings.

Figure 2:
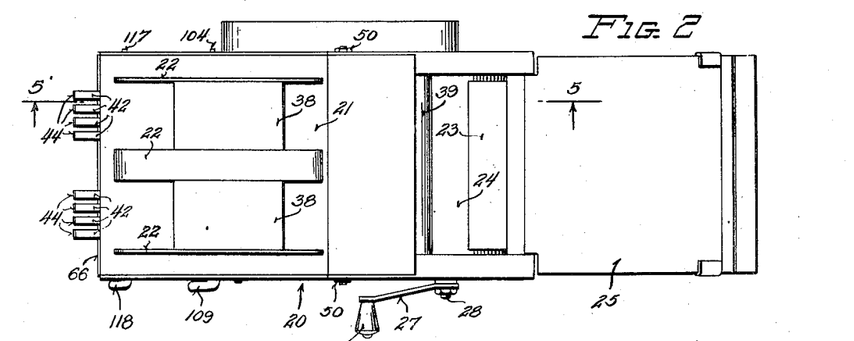
Fig. 2 is a top plan view of the machine shown in Fig. 1.
Figures 3, 4:
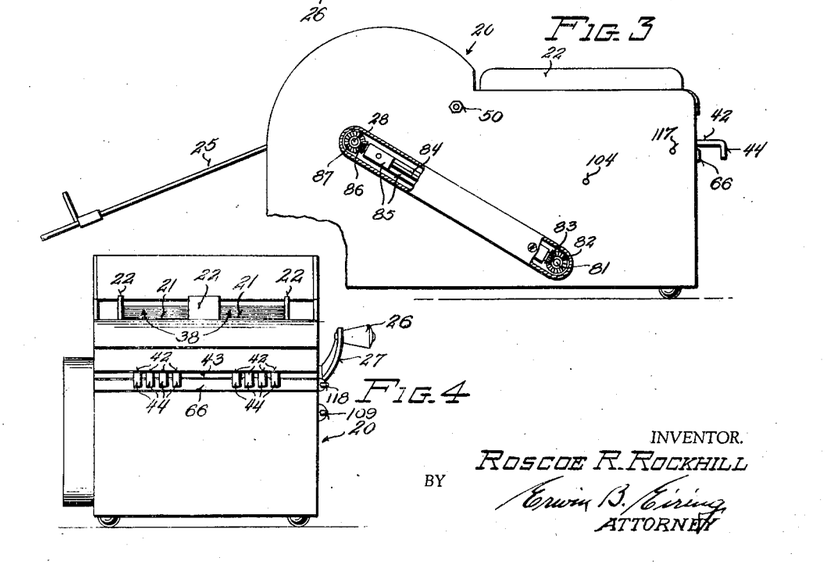
Fig. 3 is a far side elevational view of the machine shown in Fig. 1.
Fig. 4 is an elevational view of the sheet feed end of the machine shown in Fig. 1.

The duplicating machine shown in the accompanying drawings comprises a body portion 20 composed of the usual side and end walls and including a copy sheet feed surface 21 provided with sheet guide members 22 that may be adjusted into proper relationship to align the copy sheet with a master sheet 23 releasably retained on a duplicating drum 24 in any approved manner. Referring to Fig. 2, it will be noted that the present machine is set up in a manner to provide for the simultaneous production of two copy sheets from separate portions of a single master sheet. Obviously, separate master sheets may also be employed and it is to be understood that the separation of the wiper elements into two banks is merely for the purpose of illustrating the flexibility of the machine constructed in accordance with the teachings of the present invention. The individual squeegee or wiper elements may be of any desired width and they may be associated either in abutting or spaced relationship as the nature of the work may require. In the machine illustrated, I have chosen to utilize hand feed for the copy sheets, however automatic feed may also be provided without requiring any change in the structure of the block-out mechanism. A copy sheet receiving tray 25 is applied to the machine in the usual manner and provides a surface on which the copies may be deposited upon completion of each cycle of operation of the machine.

The machine shown in the accompanying drawings is hand operated by means of a crank handle 26 secured to the outer extremity of an arm 27 that is anchored at its inner end to one extremity of a drum shaft 28 suitably journalled in the side walls of the body portion 20. As the drum 24 is rotated under action of the handle 26, a roughened peripheral surface 29 on a cam 30 carried by the shaft 28 engages a rubber disc 31 secured to a shaft 32 journalled in suitable bearing blocks 33 (one of which is shown). A rubber roller 34 is formed on the shaft 32. A moistening roller 35 and another rubber roller 36 are also journalled for free rotary movement in the bearing blocks 33. Any suitable means such as a coil spring (not shown) may be utilized to urge the rubber roller 36 into contact with the moistening roller 35 and in turn urge the moistening roller 35 into frictional contact with the rubber driving roller 34. A container 37 is so disposed around the rollers 35 and 36 as to form a tank adapted to receive a sufficient amount of moisting liquid to partially submerge the rubber roller 36 so that the same is constantly rotated in a bath of the moistening liquid. Moisture from the rubber roller 36 is transferred to the moistening roller 35 by reason of the surface contact between the rollers 35 and 36. In the absence of any block-out mechanism, the moisture from the surface of the moistening roller 35 is transferred to the lower surface of a copy sheet 38 that may be fed either manually or automatically between the feed roller 34 and the moistening roller 35. Continued rotation of the handle 26 and drum 24 will advance the copy sheet 38 under an impression roller 39 preferably formed of resilient material. With the copy sheet lying between the impression roller 39 and the drum 24, it will be in pressure contact with a master sheet 23 that is releasably retained upon the duplicating drum 24 in any approved manner, such as by the use of a clamping bar 40.

Referring to the structure of the block-out mechanism (see Fig. 7) it will be noted that each wiper element comprises a bar 42 having one extremity thereof passing through a horizontally disposed slot 43 formed in the sheet feed end wall of the machine. The outer extremity of the bar 42 is turned downwardly to provide a finger engaging surface 44 by which the bar may be pushed longitudinally. The other extremity of the bar 42 is provided with a longitudinal slot 45 adapted to receive anchoring screws 46 which serve to secure a base portion 47 of a wiper element 48 to the bar 42. A supporting bar 49 which extends transversely of the machine is anchored in the side wall thereof in any suitable manner such as by the application of nuts 50. The supporting bar 49 is adapted to receive a sliding block 51 on which the free end of the base portion 47 of the wiper element 48 may be slidably guided, by means of a stud 52 which passes through a slot 53 in the base portion 47 of the wiper element 48. The stud 52 serves to anchor the sliding block 51 in desired position upon the supporting bar 49. A sleeve element 54 surrounds the stud 52 to provide a sliding contact for the guide slot 53 formed in the wiper element 48. The remaining portions of the wiper element 48 comprise a sheet of rubber 55 or other suitable material and a relatively thin spring backing element 56. The rubber sheet 55 and the backing element 56 are secured to an intermediate portion of the base 47 of the wiper element 48 by means of screws 57. The rubber sheet 55 and the backing element 56 are provided with slots 58 and 59 respectively which align with the slot 53 formed in the portion 47 of the wiper element 48. It should be noted at this point that the free end of the wiper element 48 is provided with an upwardly turned lip 60 to provide a means for directing the rubber squeegee or wiper 55 in an upward direction. The squeegee 55 and resilient backing element 56 are retained in pressure contact with the lip 60 by the application of a washer 61 and a nut 62 to the stud 52. It should also be noted at this point that the free end of the resilient backing element 56 extends beyond the lip 60 to provide a means for retaining the rubber wiper element 55 in frictional wiping contact with the moistened roller when the wiper bar is urged to its extreme forward or wiping position (see Fig. 10).

Figure 7:
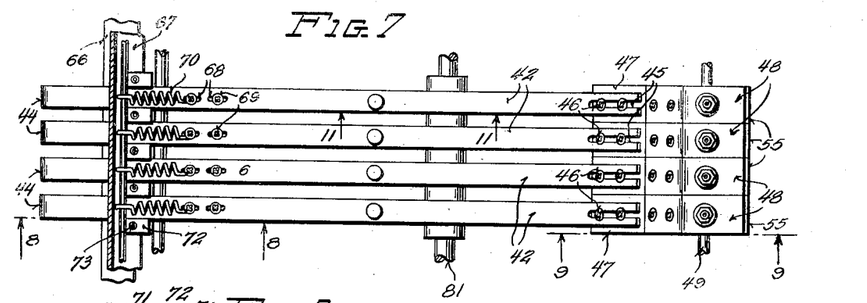
Fig. 7 is a top plan view of a group or bank of squeegee or wiper elements showing their relative positioning and individual manually operable control elements.

When wipers 48 are under manual control, a latching mechanism is utilized to releasably retain the wiper bar 42 in operative position. This latching mechanism comprises a bar 63 applied to the wiper bar 42 adjacent its manually operable end. The bar 63 is provided with an angularly disposed end 64 adapted to engage the forward horizontal edge 65 of an angle bracket 66 that is applied across the sheet feed end of the machine along the bottom edge of the slot 43. The upper edge of the slot 43 comprises an inwardly directed flange 67 which overlies the horizontal run of the angle bracket 66 and is disposed in parallel spaced relationship therewith. The bar 42 is provided with a pair of longitudinally spaced slots 68. The slots 68 provide openings through which anchoring screws 69 may be passed to secure the bar 63 to the bottom surface of the bar 42. The slots 68 provide a means by which the bar 63 may be adjusted longitudinally to insure proper frictional contact between the rubber wiper 55 and the moistening roller 35 when the wiper bar 42 is urged to its forward latched position wherein the angular face 64 formed on the bar 63 is in latched engagement with the edge 65 of the angle bracket 66. Means is provided in the form of a coil spring 70 for releasably retaining the wiper bar 42 in either of its extreme positions wherein the wiper 55 is either free from contact with the moistening roller 35 or in frictional wiping contact therewith. One end of the coil spring 70 is secured beneath the head of one of the locking screws 69 and the other end thereof is secured to a bar 71 which is retained in contact with a plurality of spacer blocks 72 that are adapted to be releasably retained in adjusted lateral position upon the flange 67 by means of anchoring screws 73.

Figure 9:
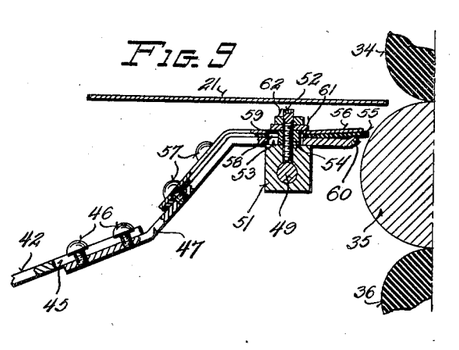
Fig. 9 is an enlarged vertical sectional view taken on the line 9—9 of Fig. 7 showing the wiper end of a bar in free position and having parts broken away to show the structural details thereof.

In the event that the machine is intended solely for manual control, the mechanism above described will satisfy the requirements of the machine. For the purpose of illustrating the above statement let us consider the showing in Fig. 7 of the accompanying drawings wherein a bank of four wiper elements 48 are shown in abutting relationship. Let us assume that the width of the sheet or card to be produced from the master sheet is equal to the combined widths of the four wiper elements 48 and that the material on the master sheet is contained on four lines. If it is desired to omit the material contained on any line, this may be done by merely pressing the surface 44 of the selected wiper bar 42 to urge the bar inwardly against the action of the coil spring 70 until such time as the edge 64 of the bar 63 latches on the complementary edge 65 of the angle bracket 66. When this latching engagement is accomplished, the rubber wiper element 55 is displaced from the free position shown in Fig. 9 to the frictional wiping contact position indicated in Fig. 10. When the crank handle 26 is rotated, the copy sheet or card 38 is fed between the rollers 34 and 35, and the moisture normally carried on the surface of the moistening roller 35 will be transferred to the lower surface of the sheet or card 38 save that portion of the roller contacted by the rubber wiper element 55 latched in its wiping or roller contacting position. The action of the rubber wiper element 55 against the roller 35 is such as to completely free the roller of all moisture. Since it is essential that there be a moistened surface in contact with the master sheet in order that material or data contained thereon may be transferred to a copy sheet, the absence of moisture on the portion of the roller contacted by the rubber wiper element 55 precludes the transferring of material on the master sheet to the copy sheet along the selected line of the wiper which had been latched in roller engaging position. Obviously, any number or combination of wiper elements may be latched in roller contacting position with the result that any number of lines or combination of lines may be printed on one or any number of copies that may be struck from the master sheet. It will be quite evident that when manual manipulation of the wiper element is utilized, as above described, it will be extremely difficult to omit any specific entry or portion of a line as a copy sheet is being passed through the machine. In view of this difficulty a manual control of the machine is desirable only in the instances where complete lines of the material or data contained on the master sheet may be omitted.

By utilizing automatic control of the wiper elements it is possible to block-out any selected portion or portions of each individual line and thereby provide a simple and effective means for blocking out either a single, several, or an entire column of entries on any copy in accordance with the set-up of the power driven cam elements about to be described.

Figure 6:
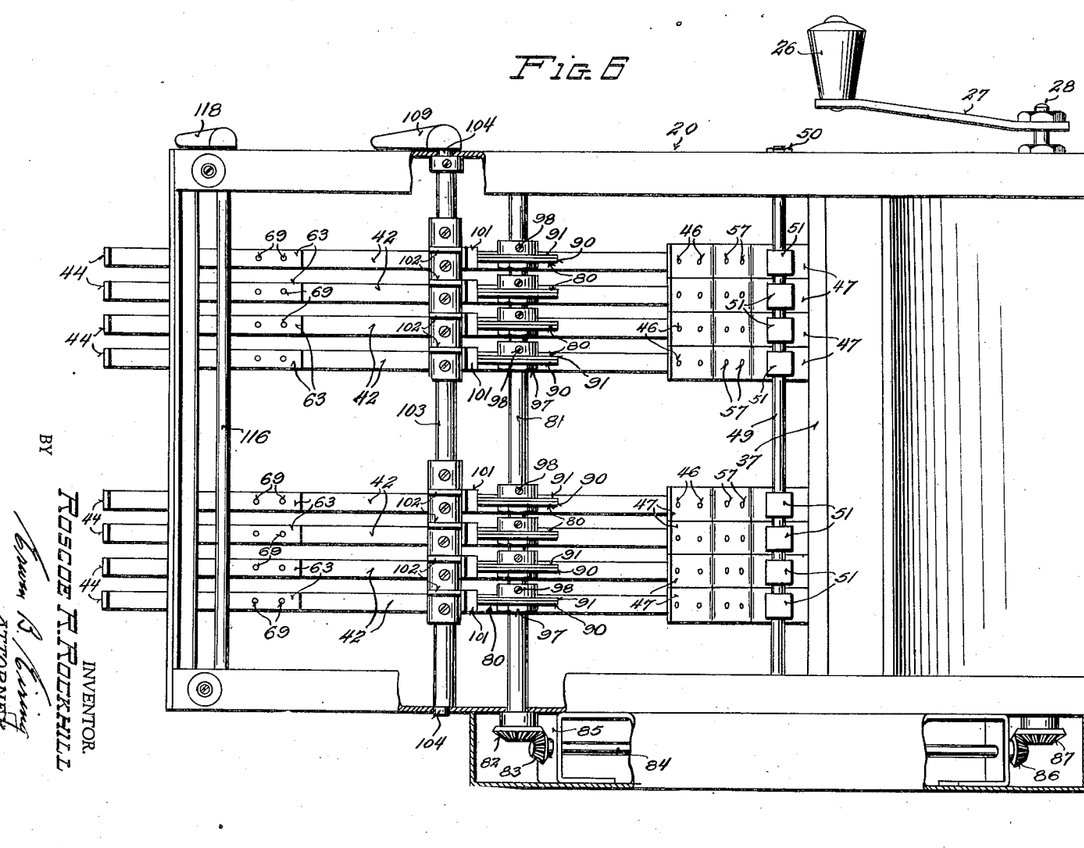
Fig. 6 is a fragmentary bottom plan view of the machine shown in Fig. 5 with parts broken away to disclose structural details of portions of the machine.

For automatic individual control of the several wiper elements 48 separate cams 80 are anchored in spaced relationship on a cam shaft 81 that is journalled in the side walls of the body portion 20 of the machine. One end of the shaft 81 is provided with a bevel gear 82 (see Fig. 6) which meshes with a companion bevel gear 83 mounted on the end of a shaft 84 that is journalled in a mounting bracket 85 secured to the side wall of the body portion 20 of the machine. The other end of the shaft 84 carries a bevel gear 86 that meshes with a companion bevel gear 87 secured to the outer extremity of the duplicating drum shaft 28. It should be noted at this point that the gear ratio between the drum shaft 28 and the cam shaft 81 is a one to one ratio so that the cam shaft will complete one revolution with each revolution of the drum 24 under action of the crank handle 26.

Figure 11:
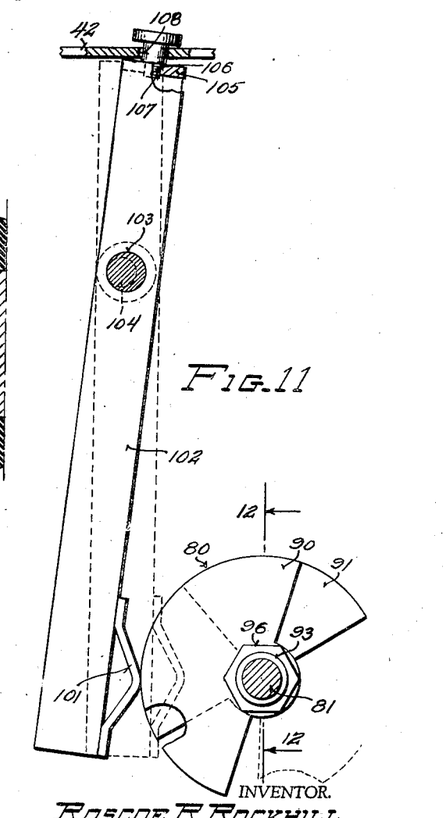
Fig. 11 is an enlarged vertical sectional view on the line 11—11 of Fig. 7 showing the wiper actuating cam, the cam follower, and follower actuated arm for moving the wiper bar under automatic control of the cam element.
Figure 12:
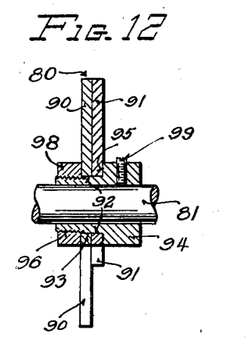
Fig. 12 is an enlarged vertical sectional view taken on the line 12—12 of Fig. 11 showing the detail structure of one of the adjustable wiper actuating cam elements.

The structure of the cams 80 is best shown in Figs. 11 and 12 of the drawings. Each cam 80 comprises a pair of plates 90 and 91 that are each provided with a central bore 92 adapted to be received on a neck portion 93 of a sleeve 94 having a shouldered portion 95 on one end and a reduced threaded portion 96 on the other end. The plates 90 and 91 are of sector formation so that they may be angularly adjusted with respect to one another in a manner to provide an effective surface of desired length to maintain the wiper element 55 in contact with the moistened roller 35 throughout the desired portion of rotation of the duplicating drum 24 so as to delete the desired portion of the material or data contained on the master sheet, by removing moisture from the moistening roll in synchronism with the advance of the copy sheet 38 over the moistening roller 35 and with the material or data contained on the master sheet with which the copy sheet registers in pressure contact under action of the impression roller 39 against the drum 24. The plates 90 and 91 are retained in desired position of relative adjustment by the application and tightening of a nut 98 receivable on the threaded portion 96 of the sleeve 94. The entire cam assembly is retained in desired axial position upon the cam shaft 81 by tightening a set screw 99 which passes through the shoulder portion 95 and contacts the cam shaft 81. A cam follower 101 is secured adjacent the lower end of a follower arm 102 rockably mounted on a shaft 103 that is provided with eccentric bearing elements 104 (see Fig. 6) journalled for rockable mounting in the side frames of the body portion 20 of the machine. The upper end of each follower arm 102 is turned to provide a flange 105 that is provided with a screw threaded aperture 106 adapted to receive a set screw 107 that passes through a hole 108 formed in the wiper bar 42. A handle element 109 (see Fig. 6) is secured to an extended portion of one of the eccentric bearing members 104 to provide a means for selectively moving the cam follower assembly into or out of the path of travel of the cam elements 80. When the handle 109 is thrown toward the sheet feed end of the machine the cam followers 101 are out of the path of travel of the cams 80 and hence there will be no automatic movement of the wiper elements since the cams are ineffective. However, when the handle 109 is thrown toward the crank handle 26, the cam followers 101 will be moved into the path of travel of the cams 80 and rotation of the crank handle 26 will effect rotation of the cam shaft 81 and cause the several cams 80 to be rotated in unison in timed relationship with the duplicating drum 24. Each cam 80 is adapted to contact one of the cam followers 101 to control the automatic movement of one wiper element 48 of the bank of elements. The several cam elements 80 are adjusted individually by the angular disposition of the sector elements 90 and 91 so that the length of cam surface adapted to contact the individual cam follower 101 will control the duration of contact of the associated wiper element 48 with the surface of the moistening roller 35. As previously described, the contact of the wiper element 48 with the moistening roller 35 results in the removal of all of the moistening liquid from the contacted surface of the roller and hence renders the portion of the surface of the copy sheet that contacts the dry surface of the roller free from the moisture necessary to transfer a print of the material contained on the master sheet to the dry portion of the copy sheet with the result that a block-out of that material is effected automatically by the action of the wiper element under the control of the cam element rotating in unison with the duplicating drum.

Figure 10:
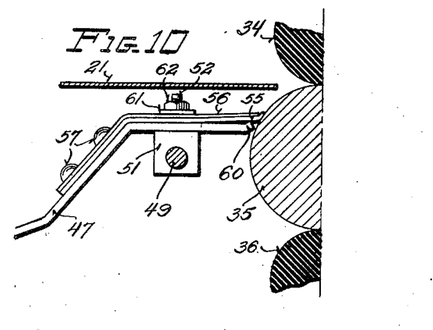
Fig. 10 is an enlarged detail view similar to Fig. 9 but showing a wiper element in wiping contact with the moistening roller.

Referring specifically to Fig. 11 of the drawings, the full line showing indicates the position of the cam follower arms 102 when the handle element 109 is moved to its forward position wherein the wiper elements 48 are under the automatic control of the cam elements 80 and the peripheral surface of the cam 80, that is shown, is in contact with the cam follower 101. With this condition existing, the wiper element 48 is urged into contact with the roller 35 as indicated in Fig. 10 against the action of the coil spring 70 that normally retains the wiper free from contact with the roller. The position of the cam follower arm 102 indicated in dotted lines in Fig. 11 shows the position assumed when the wiper 48 is free from contact with the moistening roller 35; this condition exists when the cam follower 101 has ridden off of the peripheral surface of the cam 80 and the coil spring 70 has acted to effect the retracting movement of the wiper bar 42 to free the wiper from contact with the moistening roller.

Referring specifically to the cam elements 80 it is to be understood that these elements may be made in any appropriate manner and form and that they may be produced in a variety of contours dictated by the type of work to be accomplished. In any instance, however, the length of the peripheral surface will control the duration of contact between the squeegee and the moistening roller and the space between the ends of the cam surface will regulate the portion of the roller that will remain moist to permit the transfer of material from the master sheet to the copy sheet as the same progresses through the machine.

With the individual cams 80 adjusted to the requirements of the work at hand, any number of copies, within the limits of the machine, may be produced omitting any desired entry or series of entries in any column or combination of columns. Obviously with this arrangement, a single master sheet containing full and complete data or material may serve as a master for any number of copies with various choices of combinations of entries of desired selection by merely altering the adjustment of the individual cam elements or by rendering them ineffective by loosening selected ones from driving contact with the cam shaft 81.

Figure 5:
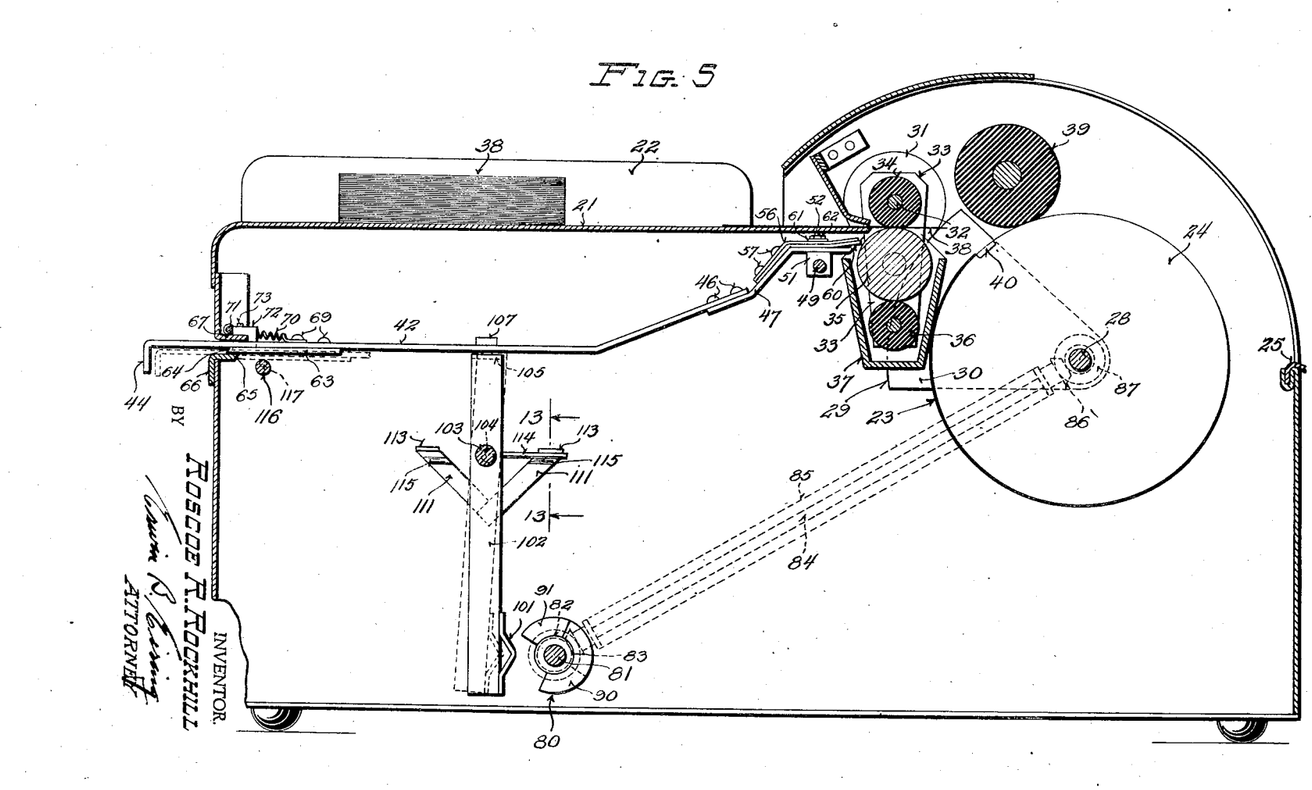
Fig. 5 is an enlarged vertical longitudinal sectional view taken on the line 5—5 of Fig. 2 showing the general structure of a wiper element and its associated mechanism.
Figure 13:
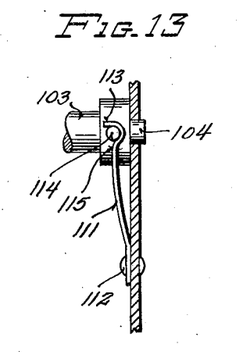
Fig. 13 is an enlarged elevational view taken on the line 13—13 of Fig. 5 showing the cam follower bar latch mechanism.
Figure 14:
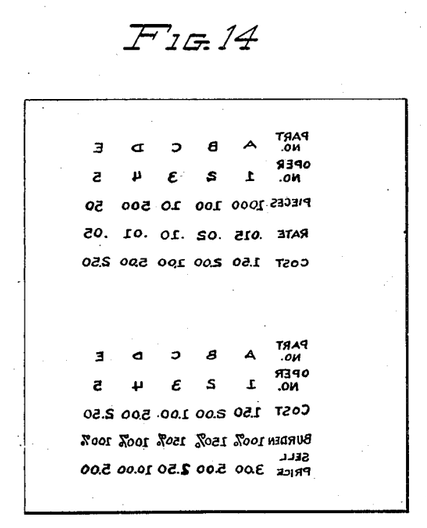
Fig. 14 is a plan view of the back of a master sheet showing the carbon impression of the material contained thereon.
Figure 15:
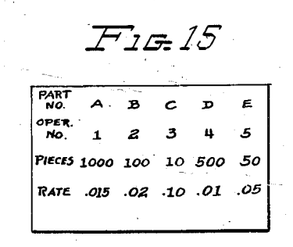
Fig. 15 is a view of a copy sheet sruck from the master showing only the material desired on the particular copy.
Figure 16:
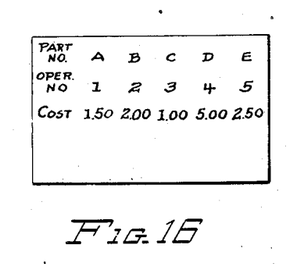
Fig. 16 is a view of another copy sheet taken at random from a series of any number of combinations of printed material and blanks that may be obtained by the use of the present block-out mechanism.

A suitable latch mechanism (see Figs. 5 and 13) is provided for releasably retaining the cam follower supporting shaft 103 in either of its extreme positions. The latch mechanism comprises a spring finger element 111 secured to the side wall of the machine in any appropriate manner such as by the application of screws 112. The ends of the finger element 111 are each provided with an inwardly directed flange 113 to limit the movement of the shaft 103 through contact with a pin 114 secured in the shaft 103. A rib 115 formed on the finger 111 adjacent the flange 113 provides a raised portion adapted to releasably retain the pin 114 between the rib 115 and the flange 113 to retain the shaft in either of its extreme positions so that the action of the cam elements 80 on the cam followers 101 will not effect a rocking action on the shaft 103 to release it from its manually adjusted forward or rearward position.

In the event that the wiping elements of the machine are under automatic control of the cam elements, no manual manipulation of the bars 42 is required and the several copies of the desired material contained on the master sheet may be disposed with the greatest of ease even though the copies require the blocking-out of individual entries in different positions in the several columns of the sheet.

The last mentioned condition is not capable of ready accomplishment with hand operation of the machine and hence an automatic block-out device of the character herein disclosed provides a machine of great utility for work of this character.

In the event that the wiper elements are under manual control, the several wiper bars 42 may be selectively urged to their forward latched position wherein the end 64 of the bar 63 is engaged with the forward edge 65 of the latching bar 66.

Figure 1:
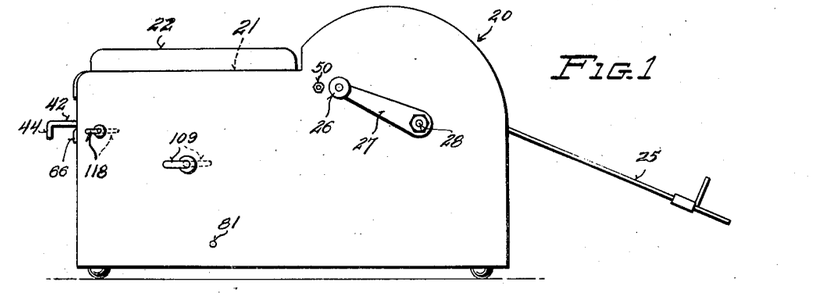
Figure 1 is an operator's side elevational view of a duplicating machine embodying the teachings of the present invention by incorporating therein the improved block-out mechanism.
Figure 8:
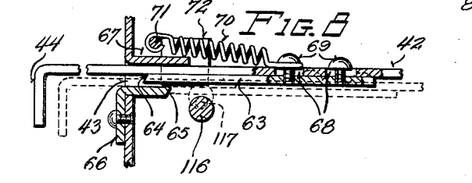
Fig. 8 is an enlarged vertical sectional view taken on the line 8—8 of Fig. 7 showing the bar latch end of a wiper element in free position in full lines and in latched position in dotted lines.

To facilitate the unlatching of all of the bars 42 simultaneously upon completion of a set of copy sheets, a suitable mechanism is provided in the form of a shaft 116 that is provided with eccentric trunnions 117 on each end. The eccentric trunnions are journalled in the side walls of the machine in such position that the shaft 116 lies immediately beneath the bars 63 when it is in its lowermost position. A handle element 118 is secured to an extended end of the shaft 116 to provide a means for rocking the shaft from its inactive position, above referred to, to its active position. When the handle 118 is moved from the position shown in full lines in Fig. 1 to the dotted position, the shaft 116 moves from the full line position shown in Fig. 8 to the dotted line position. This movement frees the latching engagement between the bar 63 and the bracket 66 to permit the springs 70 to return the several wiper bars 42 to their retracted position simultaneously wherein the wiper elements 48 are removed from contact with the moistening roller 35 and are in position to be manually actuated in a manner to selectively effect the desired arrangement or combination of wipers that will be utilized for removing moisture from the moistening roller in accordance with the requirements of the succeeding copy or copies to be struck from the master sheet.

From the foregoing description it will be readily understood that a new and improved block-out mechanism has been provided, whereby selected portions of the material contained on a master sheet may be blocked-out selectively either manual or automatic control. In the instance where the block-out mechanism is under automatic control individual entries or groups of entries may be blocked-out from any selected column or combination of columns contained on the master sheet.

While the invention has been described in considerable detail in the foregoing specification, it is understood that various changes may be made in its embodiments without departing from or sacrificing any of the advantages hereinafter claimed.

I claim:

1. The combination with a duplicating machine of the moistened roller type including a rotatable duplicating drum, a master sheet retaining means on said drum, and cooperating copy sheet moistening and feed rollers adapted for intermittent operation under the control of said rotatable duplicating drum, of a block-out mechanism operative to control the application of moisture to said moistening roller whereby a selected portion of the material contained on the master sheet may be blocked out from copy sheets made therefrom, said block-out mechanism including a wiper element adapted to be moved into and out of contact with said moistening roller, a manually operable element connected to said wiper element for moving the same, means operative for normally retaining said wiper element out of contact with said rotatable moistening roller, and means operative for retaining said wiper element in pressure contact with said rotatable moistening roller to effect the removal of moisture from the portion of said roller disposed to contact the portion of a copy sheet that lies in alignment with the portion of the master sheet to be blocked out, whereby a block-out of material contained on the master sheet is effected when the moisture-free portion of the copy sheet contacts the master sheet.

2. The combination with a duplicating machine of the moistened roller type including a rotatable duplicating drum, a master sheet retaining means on said drum, and cooperating copy sheet moistening and feed rollers adapted for intermittent operation under the control of said rotatable duplicating drum, of a block-out mechanism operative to control the application of moisture to said moistening roller whereby a selected portion of the material contained on the master sheet may be blocked out from copy sheets made therefrom, said block-out mechanism including a wiper element adapted to be moved into and out of contact with said rotatable moistening roller, a manually operable element connected with said wiper element, means operative for normally retaining said wiper element in its retracted position wherein it is out of contact with said moistening roller, said manually operable element being movable to effect pressure contact between said wiper element and said rotatable moistening roller, and means operative for releasably retaining said wiper element in contact with said rotatable moistening roller to effect the removal of moisture from the portion of said roller disposed to contact the portion of a copy sheet that lies in alignment with the portion of the master sheet to be blocked out, whereby the undesired material contained on the master sheet will be blocked-out of the moisture-free portion by the copy sheet as said copy sheet passes in pressure contact with the master sheet.

3. The combination with a duplicating machine of the moistened roller type including a rotatable duplicating drum, a master sheet retaining means on said drum, and cooperating copy sheet moistening and feed rollers adapted for intermittent operation under the control of said rotatable duplicating drum, of a block-out mechanism operative to control the application of moisture to said moistening roller whereby a selected portion of the material contained on the master sheet may be blocked out from copy sheets made therefrom, said block-out mechanism including a plurality of wiper elements adapted to be selectively moved into and out of pressure contact with the rotatable moistening roller, a manually operable element connected with each of said wiper elements, means for normally retaining each of said wiper elements out of pressure contact with said roller, said manually operable elements being movable selectively to effect a pressure wiping contact between said roller and said selected wiper elements, and means for releasably retaining said selected wiper elements in wiping contact with said roller to effect the removal of moisture from such portions of said rotatable moistening roller as are contacted by said selected wiper elements and are disposed to contact the selected portions of a copy sheet that lie in alignment with the portions of the master sheet selected to be blocked out, whereby such material contained on the master sheet will be blocked-out from the moisture-free portions of the copy sheet as it passes in pressure contact with the master sheet.

4. In a duplicating machine including a duplicating drum, a master sheet receiving means on said drum, an impression roller in pressure contact with said drum, a feed roller driven in synchronism with said drum, a moistening roller driven in synchronism with said feed roller, the combination of a block-out mechanism operative to control the application of moisture to said moistening roller whereby a selected portion of the material contained on the master sheet may be blocked out from copy sheets made therefrom, said block-out mechanism including a squeegee element mounted adjacent said moistening roller, manually operable means for moving said squeegee element into wiping contact with said moistening roller to effect the removal of moisture from a portion of said rotating moistening roller disposed to contact the portion of a copy sheet that lies in alignment with the portion of the master sheet to be blocked out whereby a block-out of the undesired portion of the material contained on the master sheet is effected when the moisture-free portion of the copy sheet contacts the master sheet.

5. In a duplicating machine including a duplicating drum, a master sheet receiving means on said drum, an impression roller in pressure contact with said drum, a copy sheet feed roller driven in synchronism with said drum, a moistening roller driven in synchronism with said copy sheet feed roller, the combination of a block-out mechanism operative to control the application of moisture to said moistening roller whereby a selected portion of the material contained on the master sheet may be blocked out from copy sheets made therefrom, said block-out mechanism including a squeegee element mounted adjacent said moistening roller, means adapted to normally retain said squeegee element out of contact with said moistening roller, manually operable means for moving said squeegee element into wiping contact with said moistening roller, and latching means operable to releasably retain said squeegee element in wiping contact with said moistening roller to preclude moisture from being transferred to that portion of a copy sheet fed in pressure contact with said moistening roller that lies in alignment with the portion of the material contained on the master sheet to be blocked out whereby the unmoistened portion of the copy sheet is uneffected by pressure contact with said master sheet to block-out the selected portion of material contained thereon.

6. A block-out device for duplicating machines of the moistened roller type comprising a bar, a wiper element on said bar, said wiper element being disposed adjacent the peripheral surface of the moistening roller, guide and supporting means for said bar, manually operable means for effecting movement of said bar toward said moistening roller, means for latching said bar in a position wherein said wiper element is in wiping contact with the moistening roller to effect removal of moisture therefrom, and spring means operable upon release of said latching means to effect the withdrawal of said wiper from contact with said moistening roller.

7. A block-out device for duplicating machines of the moistened roller type comprising in combination a bar, a wiper element on said bar, said wiper element disposed adjacent the peripheral surface of said moistening roller, guide and supporting means for said bar and said wiper element, manually operable means for effecting movement of said bar and wiper element toward the moistening roller, latching means for releasably retaining said bar in a position wherein said element is in wiping contact with said moistening roller to effect removal of moisture therefrom when said moistening roller is rotated, and means operable upon release of said latching means to effect the withdrawal of said wiper element from contact with said moistening roller.

8. A block-out device for duplicating machines of the moistened roller type comprising a plurality of wiper elements disposed adjacent the peripheral surface of the moistening roller, an operating bar associated with each of said wiper elements, spring means operative to normally retain said wiper elements out of contact with said moistening element, manually operable means for moving selected wiper elements into wiping contact with said moistening roller, latching means operatively associated with each of said wiper elements, said latching means being operable to releasably retain the selected wiper elements in wiping contact with the moistening roller to effect removal of moisture from the roller contacting the actuated wiper elements, and spring means operable upon release of said latching means to effect the withdrawal of said wiper elements from contact with said moistening roller.

9. An automatic block-out mechanism for duplicating machines of the moistened roller type including a duplicating drum, an impression roller, a driven copy sheet feed roller and a driven moistening roller, said automatic block-out mechanism comprising a bar, a squeegee element on said bar, a cam follower operatively associated with said bar and a cam element driven in synchronism with said drum, copy sheet feed roller and said moistening roller, said cam adapted to contact said cam follower to provide automatic means for effecting a wiping action of said squeegee element upon said moistening roller whereby moisture is removed from the portion of the moistening roller contacted by said squeegee element to preclude the moistening of a copy sheet fed into pressure contact with said moistening roller with the result that the material contained on the master sheet will be blocked out from the moisture-free portion of the copy sheet as it passes the pressure contact with the master sheet under action of said impression roller.

10. An automatic block-out mechanism for duplicating machines of the moistened roller type, including a duplicating drum and a driven moistening roller, said automatic block-out mechanism comprising a bar, a squeegee element on said bar, a cam follower operatively associated with said bar, and a cam element driven in synchronism with said drum and said moistening roller, said cam providing means for automatically effecting movement of said squeegee element into wiping contact with said moistening roller in timed relationship with the rotation of said drum, whereby a portion of the surface of said moistening roller is wiped free of moisture to preclude the moistening of a copy sheet passed over said moistening roller with the result that the material contained on the master sheet will be blocked-out from the moisture-free portion of the copy sheet as it passes in pressure contact with the master sheet mounted on said duplicating drum.

11. An automatic block-out mechanism for duplicating machines of the moistened roller type including a duplicating drum, an impression roller, a driven copy sheet feed roller and a driven moistening roller, said automatic block-out mechanism comprising a plurality of squeegee elements disposed adjacent said moistening roller, an operating bar associated with each of said squeegee elements, a cam follower operatively associated with each of said bars and a cam element disposed adjacent each of said cam followers, said cam elements being driven in synchronism with said drum, copy sheet feed roller and said moistening roller, said cams each adapted to contact one of said cam followers to provide automatic means for effecting the wiping action of its associated squeegee element upon said moistening roller in accordance with the contour of said cam whereby moisture is removed from the several portions of the moistening roller contacted by said individual squeegee elements to preclude the transfer of moisture to a copy sheet fed into pressure contact with the moisture-free portions of said moistening roller with the result that the material contained on the master sheet will be blocked-out from the moisture-free portions of the copy sheet as it passes in pressure contact with the master sheet under action of said impression roller.

12. An automatic block-out mechanism for duplicating machines of the moistened roller type including a duplicating drum, an impression roller, a driven copy sheet feed roller, and a driven moistening roller, said automatic block-out mechanism comprising a plurality of squeegee elements disposed adjacent said moistening roller, a supporting member for said squeegee elements, means for adjusting a lateral position of said squeegee elements on said supporting member, means for releasably retaining said squeegee elements in their laterally adjusted positions on said supporting member, an operating bar associated with each of said squeegee elements, a cam follower operatively associated with each of said bars, a cam shaft disposed adjacent said cam followers, gearing for driving said cam shaft in timed relationship with the rotation of said duplicating drum, a plurality of cam elements on said cam shaft, each of said cam elements being laterally adjustable in accordance with the position of its associated squeegee element and each of said cam elements being angularly adjustable with relation to said cam shaft for the purpose of selecting the portion of said moistening roller to be contacted by its associated squeegee element, said cam elements being operative to provide individual means for effecting the automatic wiping action of its associated squeegee element upon said moistening roller in accordance with the contour and angular adjustment of the individual cam on said cam shaft, whereby moisture is removed from the several portions of the moistening roller contacted by said individual squeegee elements to preclude the transfer of moisture to a copy sheet fed into pressure contact with said moistening roller under action of said feed roller with the result that the material contained on the master sheet will be blocked-out from the moisture-free portions of the copy sheet as it passes in pressure contact with the master sheet under action of said impression roller.

13. An automatic block-out mechanism for duplicating machines of the moistened roller type including a duplicating drum, an impression roller, a driven copy sheet feed roller, and a driven moistening roller, said automatic block-out mechanism comprises a wiper element disposed adjacent the periphery of said moistening roller, guide and supporting means for said wiper element, a cam follower on said wiper element, a cam shaft disposed adjacent said cam follower element, said cam shaft being driven by gearing in timed relationship with said duplicating drum, a cam element on said cam shaft, means for adjusting the angular position of said cam on said cam shaft whereby the position of the active portion of said cam may be adjusted to effect the operation of said wiper elements in timed relationship with the advance of a copy sheet over said moistening roller in a manner to preclude the application of moistening liquid to a selected portion of said copy sheet with the result that the material contained on the master sheet will be blocked out from the moisture-free portion of the copy sheet as it passes in pressure contact with the master sheet under action of said impression roller.

14. In a duplicating machine of the moistened roller type, the method of blocking-out portions of the material contained on a master sheet from copies struck therefrom which comprises the application of a squeegee element to the surface of a moistened roller to remove the moisture from a selected portion of the surface of said roller, passing a copy sheet in pressure contact with said roller whereby the copy sheet is moistened uniformly save for the area contacting the moisture-free portion of said roller, and passing the treated copy sheet into pressure contact with a master sheet whereby the material on the master sheet contacted by the moistened portion of the copy sheet is transferred thereto and the moisture-free portion of the copy sheet is unaffected by contact with the master sheet whereby a block-out of a selected portion of material contained on the master sheet is obtained on a copy made therefrom.

15. In a duplicating machine of the moistened roller type, the method of blocking-out material contained on a master sheet from copies made therefrom which comprises the application of a squeegee element to the moistened surface of a moistening roller to remove the deposit of liquid from a selected portion of the moistening roller, passing a copy sheet in pressure contact with said moistening roller to apply moisture to one side of said copy sheet in portions not wiped by said squeegee element, and passing the copy sheet in pressure contact with the master sheet under action of an impression roller, whereby the material on the master sheet contacted by the moistened copy sheet is transferred to said copy sheet and the material on the master sheet contacted by the dry portion of the copy sheet is blocked out from the copy sheet.

16. The combination with a duplicating machine of the moistened roller type including a rotatable duplicating drum, a master sheet retaining means on said drum, and cooperating copy sheet moistening and feed rollers adapted for intermittent operation under the control of said rotatable duplicating drum, of a block-out mechanism operative to control the application of moisture to said moistening roller whereby a selected portion of the material contained on the master sheet may be blocked out from copy sheets made therefrom, said block-out mechanism including a plurality of wiper elements disposed adjacent the peripheral surface of said moistening roller, a manually operable element connected to each of said wiper elements for selectively moving the same into contact with said moistening roller, means operative to releasably retain said selected wiper elements in contact with said moistening roller to effect the removal of moisture from the portion of said roller disposed to contact the portion of a copy sheet that lies in alignment with the portion of the master sheet to be blocked out, whereby a block-out of material contained on the master sheet is effected when the moisture-free portion of the copy sheet contacts the master sheet.

17. The combination with a duplicating machine of the moistened roller type including a rotatable duplicating drum, a master sheet retaining means on said drum, and cooperating copy sheet moistening and feed rollers adapted for intermittent operation under the control of said rotatable duplicating drum, of a block-out mechanism operative to control the application of moisture to said moistening roller whereby a selected portion of the material contained on the master sheet may be blocked out from copy sheets made therefrom, said block-out mechanism comprising a plurality of wiper elements disposed adjacent the peripheral surface of said moistening roller, said wiper elements being adapted for both lateral and longitudinal adjustment, means operative to releasably retain each of said wipers in selected position of adjustment, said lateral adjustment being operative to properly align the selected wiper elements with the material selected to be omitted from the copy struck from the master, said longitudinal adjustment being operative to effect the removal of moisture from the moistening roller from that portion thereof that is in alignment with the material contained on the master sheet that is to be omitted, whereby a block-out of selected portions of the material contained on the master sheet is effected when the moisture-free portion of the copy sheet contacts the master sheet.

18. A block-out device for duplicating machines of the moistened roller type comprising a plurality of wiper elements disposed adjacent the peripheral surface of the moistening roller, said wiper elements being both laterally and longitudinally adjustable, means operative to releasably retain said wiper elements in individual selected position of adjustment, said lateral adjustment being operative to properly align selected wiper elements with portions of material contained upon a master sheet desired to be omitted from copy sheets struck therefrom, said longitudinal adjustment being operative to effect the removal of moisture from the moistening roller from that portion thereof that is in alignment with the material contained on the master sheet that is to be omitted, whereby a block-out of selected portions of the material contained on the master sheet is effected when the moisture-free portion of the copy sheet contacts the master sheet in the process of producing copies therefrom.

19. A block-out device for duplicating machines of the moistened roller type comprising a plurality of wiper elements disposed adjacent the peripheral surface of the moistening roller, said elements being both laterally and longitudinally adjustable, a supporting member for said wiper elements, means operative to releasably retain said wiper elements in individual selected position of lateral adjustment on said supporting member, said lateral adjustment of said wiper elements serving to properly align them with selected portions of said moistening roller, spring means for normally retaining said wiper elements out of contact with said moistening roller, manually operable means for effecting longitudinal movement of selected wiper elements into pressure contact with said moistening roller, and latching means for releasably retaining the manually actuated wiper elements in pressure contact with said moistening roller to effect removal of moisture from the portions of said moistening roller contacted by said manually actuated wiper elements.

ROSCOE R. ROCKHILL.